H. W. YOST.
FLUID MOTOR.
APPLICATION FILED JAN. 8, 1915.

1,178,695.  Patented Apr. 11, 1916.
3 SHEETS—SHEET 2.

Witnesses  Inventor
G. H. Walmsley.  Henry W. Yost,
H. L. Hammaker.
By Toulmin Reed & Toulmin
Attorneys

THE COLUMBIA PLANOGRAPH CO., WASHINGTON, D. C.

H. W. YOST.
FLUID MOTOR.
APPLICATION FILED JAN. 8, 1915.

1,178,695.

Patented Apr. 11, 1916.
3 SHEETS—SHEET 3.

Witnesses

Inventor
Henry W. Yost,
By
Attorneys

UNITED STATES PATENT OFFICE.

HENRY W. YOST, OF SPRINGFIELD, OHIO.

FLUID-MOTOR.

1,178,695.

Specification of Letters Patent.  Patented Apr. 11, 1916.

Application filed January 8, 1915. Serial No. 1,099.

*To all whom it may concern:*

Be it known that I, HENRY W. YOST, a citizen of the United States, residing at Springfield, in the county of Clark and State of Ohio, have invented certain new and useful Improvements in Fluid-Motors, of which the following is a specification, reference being had therein to the accompanying drawing.

This invention relates to fluid motors, and more particularly to valve operating mechanism designed especially for use in connection with water motors.

In water motors, and other fluid motors of a similar character, the valves are controlled primarily by the movement of the piston, but it is necessary to provide some auxiliary means for moving the valves across an intermediate position commonly known as the "dead center." Otherwise, when the valves have been moved into this intermediate position the water will simultaneously enter and escape from the motor on both sides of the piston in such quantities that the pressure on the piston will become balanced, and, if the motor is operating under a dead load, the piston will immediately cease moving. The exact position occupied by the valves when this condition exists varies according to the load and the fluid pressure under which the motor is operating. It has been customary to provide springs for moving the valves across their dead centers, these springs being of such stiffness that they will be compressed before the valves are unseated, and, after the valves have been unseated by the movement of the piston, the springs will expand and move the valves across their dead centers. The use of springs for this purpose is not satisfactory. Principally, because the same spring will not operate satisfactorily under all conditions of load and pressure, and, where a motor is built for use under unknown conditions it is necessary to equip the same with springs of average stiffness, which may or may not work satisfactorily when the motor is installed. Further, these springs rapidly deteriorate and often break, necessitating the frequent renewal thereof.

The object of the present invention is to provide means for shifting the valves of a motor without the use of springs and to accomplish this by providing means whereby the fluid which passes about the inlet valve after the latter has been unseated will be prevented from entering the motor cylinder in advance of the piston before the inlet valve has been shifted across its dead center, that is, before the inlet valve has been moved into such a position that the normal flow of the fluid through the inlet chamber will move it to its fully seated position after said inlet valve has been moved across its dead center.

To this end, it is a further object of the invention to provide means for confining the fluid which passes about the inlet valve between the inlet valve and the exhaust valve and further to utilize this fluid to shift the exhaust valve after the inlet valve has crossed its dead center.

It is also an object of the invention to provide a mechanism to accomplish these results which will be very simple in its construction, requiring no more movable parts than are required for the ordinary puppet valve motor.

It is a further object of the invention to provide means for cushioning the movement of the valves and piston to prevent injury to the same and to the parts with which they engage.

In the accompanying drawings.

In these drawings I have illustrated four embodiments of my invention showing the same as applied to both a reciprocating motor and an oscillating motor. These several forms of the invention were chosen for the purpose of illustration only and it will be obvious that the invention is readily adaptable to motors of various kinds and to fluid meters, which operate on the same principle as the fluid motors.

In Figs. 1 to 5 I have shown the invention as applied to a reciprocating motor comprising a cylinder consisting of a cylindrical body portion 1 having its opposite ends closed by cylinder heads 2 and 3 connected by longitudinal bolts 4. Mounted within the cylinder is a piston 5 which is here shown as movable relatively to the cylinder, and, to this end, is provided with a piston rod 6 extending through a suitable stuffing box 7 in the cylinder head 3. The present form of the invention also has the inlet and exhaust valves both mounted in the piston, and, to this end, the piston is provided with an inlet chamber 8 and an exhaust chamber 9, each of which is provided with a lateral extension and these extensions, in turn, are connected with tubes 10 and 11 which are slidably mounted in inlet and exhaust pipes 12 and 13 secured to the cylinder head 2. The pipes 12 and 13 communicate, respectively, and in a well known manner with the source of supply and the exhaust conduit. The inlet chamber 8 communicates with the interior of the cylinder by means of ports 14 and 15 and these ports are controlled by an inlet valve 16 comprising a valve member adapted to seat against the opposite walls of the inlet chamber and to close either of the ports. This valve member has secured to each side thereof suitable guides, such as the fingers 17 which constitute a part of the valve and extend into the respective ports to support the valve member in proper relation thereto. The outlet chamber communicates with the cylinder on opposite sides of the piston by means of ports 18 and 19 which are controlled by an outlet valve comprising two valve members 20 and 21 connected one to the other by the usual stem 22 which extends through the ports and supports the valve members in proper relation thereto.

Means are provided whereby the movement of the piston will cause the inlet valve to be unseated to open the inlet port on the forward side of the piston. Other means are provided for controlling the flow of fluid from the inlet port on the forward side of the piston after the inlet valve has been so unseated and for confining the fluid which passes about said valve and into said port between the inlet and exhaust valves, whereby the fluid will be prevented from entering the cylinder in front of the piston and the pressure of said fluid will be exerted upon the exhaust valve to shift the same across its dead center position. There are numerous ways in which this result may be achieved. One method of accomplishing the desired result is to provide the motor with two conduits, one arranged on each side of the piston and each having one end adapted to communicate with the inlet port on the adjacent side of the piston and its other end arranged to be entered by a part connected with the exhaust valve. This latter part serves to prevent the escape of fluid from the conduit and receives the pressure of the fluid to shift the exhaust valve. These conduits may be of any suitable character and may be supported in any suitable manner, but in the form of device shown in Figs. 1 to 5 the conduits comprise castings 23 and 24 having longitudinal passages. Each conduit has its ends turned inward, that is, toward the respective ports in the piston. The upper inturned ends of the conduits are reduced, as indicated at 25, and are adapted to fit snugly within the adjacent inlet ports and to slide therein, the fit of the reduced portions of the conduits being such as to prevent the escape of fluid in appreciable quantities about the exterior thereof. The lower portions of the conduits extend in a line substantially parallel with the line of movement of the piston, as indicated at 26, and are adapted to receive parts connected with the exhaust valves, these parts preferably comprising projections 27 and 28 extending from the face of the two exhaust valve members and constituting supplemental pistons. These parts or pistons fit snugly within the adjacent portions of the respective conduits and serve in the first instance to prevent the passage of fluid from the conduit, and, in the second instance, to receive the pressure of the fluid and shift the exhaust valve after it has been unseated, as hereinafter described. These conduits, as stated, may be supported in any suitable manner, but for the purpose of maintaining the same in positive alinement with the respective ports and pistons it is desirable to mount the same directly upon the piston, and, in the present instance, the two conduits are so mounted. The conduit 23 comprises a single channel and is of such a width as to pass between the inlet and exhaust tubes 10 and 11. It is provided at its upper and lower ends with apertured lugs 29 to receive pins or bolts 30 mounted in the adjacent face of the piston and constituting supports and guides therefor. The conduit 24 is somewhat different in shape. The upper and lower ends, 25 and 26, thereof are inturned and are substantially similar to the inturned ends of the conduit 23, but these portions of the conduit are connected by an annular passage 31 which extends about the piston rod 6. This conduit is also provided with apertured lugs 32 through which extend pins 33 mounted in the adjacent face of the piston and serving to guide and support the conduit.

The supporting pins for the conduits are provided as usual with heads or stops 132 which limit the outward movement of the conduits, these stops being so arranged that the reduced portions 25 of the two conduits are never withdrawn entirely from their respective ports. The movements of the conduits with respect to the extensions or pistons 27 and 28 of the exhaust valve are such that these extensions or pistons may be entirely withdrawn from the conduits. With the valves in the position shown in Fig. 1 the piston 5 is approaching the cylinder head 2 of the motor. As the movement of the piston continues the conduit 23 will engage the cylinder head and move the conduit inward, causing the reduced portion 25 thereof to engage the inlet valve and unseat the same. Simultaneously with the engagement of the inlet valve by the reduced portion 25 of the conduit the reduced portion 27 of the exhaust valve member on the forward side of the piston enters the conduit. Consequently, the fluid which passes about the inlet valve through the port 14 into the conduit will be controlled and no fluid will enter the cylinder in advance of the piston. The exhaust valve member 21 in the rear of the piston remains seated, and, consequently, the fluid which enters in the rear of the piston, although reduced in quantity, will continue to move the piston toward the cylinder head 2 and the conduit 23 will continue to act upon the inlet valve and move the same toward the inlet port 15. As this movement continues the lower end of the conduit will engage the outer face of the exhaust valve member 20, this engagement taking place simultaneously with or after the movement of the inlet valve across its dead center position. The engagement of the exhaust valve member 20 by the lower end of the conduit 23 will unseat the exhaust valve member 21, thereby relieving the pressure on the same. When the pressure has been so relieved on the member 21 the pressure within the conduit 23 will be sufficient to act upon the piston 27 and complete the movement of the valve as a whole, thereby causing the valve member 20 to close the port 18 and preventing the further escape of fluid from the forward side of the piston. When the exhaust valve has been so reversed the action of the fluid will instantly complete the reversal of the inlet valve which has already been shifted through a considerable portion of its movement. This reversal of the valves admits the fluid between the motor piston and the cylinder head 2 and permits it to escape from the cylinder on the opposite side of said piston, thereby reversing the movement of the piston and causing the same to travel toward the cylinder head 3. As the piston approaches this cylinder head the conduit 24 operates in the same manner as in the operation just described in connection with the conduit 23 and the movement of the piston is again reversed.

Figure 1:
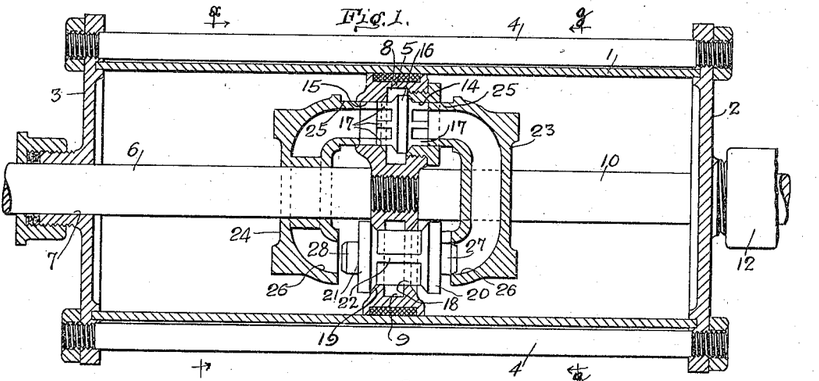
Figure 1 is a longitudinal, sectional view, taken vertically through a motor embodying my invention.
Figure 2:
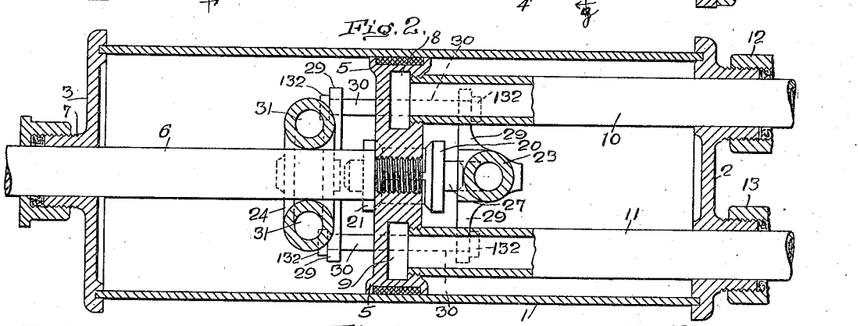
Fig. 2 is a similar view taken horizontally through such a motor.
Figure 3:
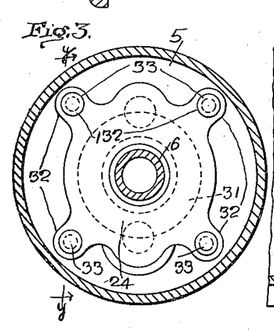
Fig. 3 is a transverse, sectional view, taken on the line $x$ $x$ of Fig. 1 and looking in the direction of the arrows.
Figure 4:
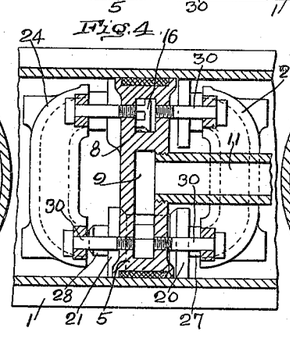
Fig. 4 is a sectional view, taken on the line $y$ $y$ of Fig. 3 and looking in the direction of the arrows.
Figure 5:
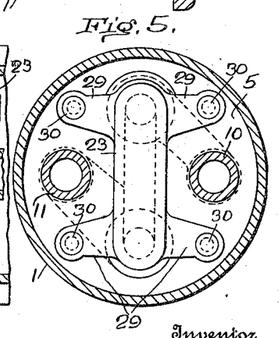
Fig. 5 is a sectional view, taken on the line $z$ $z$ of Fig. 1 and looking in the direction of the arrows.
Figure 6:
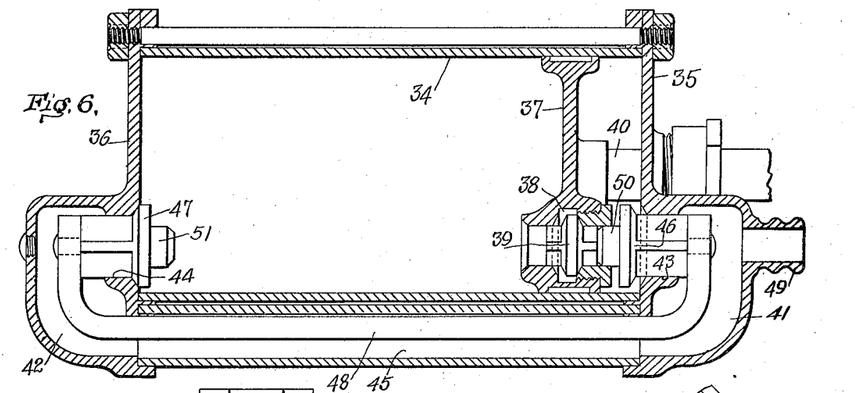
Fig. 6 is a sectional view taken longitudinally to a motor embodying a modified form of the invention.

In Fig. 6 I have illustrated a modified form of the invention as applied to a reciprocating motor. This motor comprises a cylindrical body portion 34 having its opposite ends closed by the cylinder heads 35 and 36 and having mounted therein a piston 37. This piston is provided with an inlet chamber 38 which is controlled by an inlet valve 39 of ordinary construction. This valve is connected by a tube 40 extending through the cylinder head 35 with a suitable source of fluid supply. Each cylinder head, 35 and 36, has an exhaust valve chamber, 41 and 42 respectively, communicating with the interior of the cylinder on the respective sides of the piston by ports 43 and 44. The exhaust chambers 41 and 42 are connected one with the other by a conduit or tube 45 which preferably extends longitudinally to the cylinder on the exterior thereof. The ports 43 and 44 are controlled by exhaust valve members 46 and 47 of an ordinary construction and connected one to the other by a rod or bar 48 extending through the passage 45. The two valve members 46 and 47 and their connecting rod 45 taken as a single part comprise the exhaust valve. The exhaust chamber 41 may be connected, by means of a suitable nipple 49, with an exhaust conduit. Each exhaust valve member 46 and 47 has an inwardly extending part, 50 and 51, respectively, comprising a piston. These pistons are of such a size that they will fit snugly within the adjacent inlet ports in the piston 37. With the valves in the position shown in Fig. 6 the piston is approaching the cylinder head 35 and the piston 50 has entered the adjacent inlet port. A further movement of the motor piston will cause the inlet valve to be unseated, this being true because the exposed surface of the exhaust valve member 47 is greater than the exposed surface of the inlet valve, and, consequently, the pressure on the inlet valve will be less and will be more easily overcome. The piston 50 of the exhaust valve member will prevent the fluid passing through the inlet port into the cylinder in advance of the motor piston. The further movement of the motor piston will cause the face of the valve member to be engaged by the piston, thereby moving this valve member toward its seat and through the connecting rod 48, unseating the exhaust valve member 47, thus relieving the pressure thereon. As soon as the pressure on the exhaust valve member 47 is so relieved the pressure of the fluid which is confined between the piston 50 of the exhaust valve member 46 and the inlet valve will act upon the piston 50 and move the exhaust valve 46 to its seat, thereby preventing the further escape of fluid from that side of the motor piston. When the exhaust valve members have been so reversed the action of the fluid on the inlet valve will complete the movement thereof and thereby complete the reversing of the motor.

Figure 7:
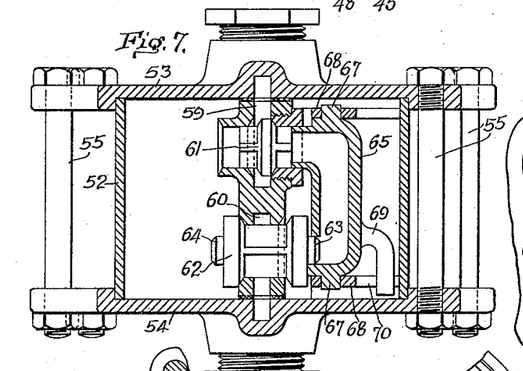
Fig. 7 is a sectional view of an oscillating motor embodying the invention, taken on the line $w$ $w$ of Fig. 8 and looking in the direction of the arrows.
Figure 8:
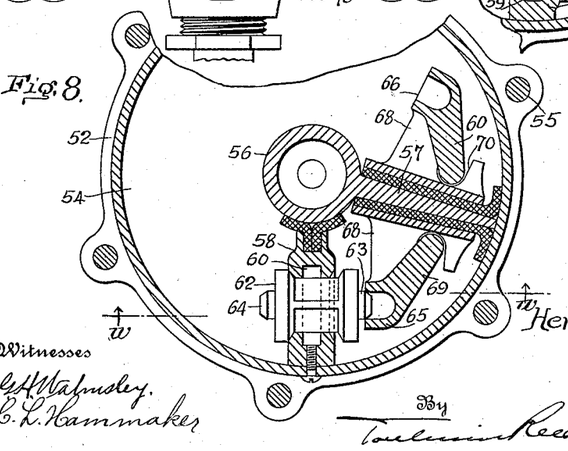
Fig. 8 is a horizontal sectional view of the motor shown in Fig. 7, taken through the exhaust valve.
Figure 9:
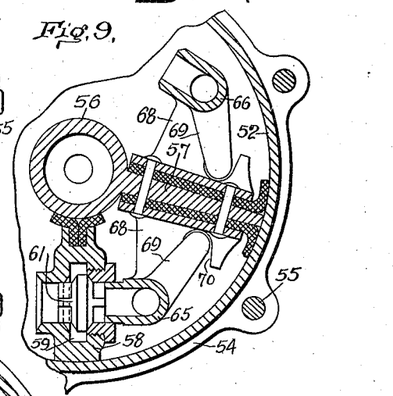
Fig. 9 is a similar view taken through the inlet valve with a portion of the casing broken away.

The invention is adaptable to motors of other types than a reciprocating motor and, in Figs. 7 to 9, I have shown one method of applying the same to an oscillating motor. As here shown this motor comprises the usual cylindrical casing 52 having its ends closed by the cylinder heads 53 and 54 which are connected one to the other by tie bolts 55. A motor shaft 56 is journaled in the cylinder heads 53 and 54 and carries a wing piston 57. A radial abutment 58 is arranged between the shaft 56 and the cylinder wall and has formed therein an inlet chamber 59 and an exhaust chamber 60 controlled by the inlet and exhaust valve 61 and 62, respectively, these valves being of well known construction. The two valve members comprising the exhaust valve are provided with extensions or pistons 63 and 64 similar to those employed in the two forms of the device above described. Conduits 65 and 66 are pivotally mounted on the piston 57 and have their upper ends reduced to enter the ports of the inlet valve chamber and their lower ends shaped to receive the pistons 63 and 64, respectively. As the piston approaches the abutment the conduit will coöperate with the inlet and exhaust valves to reverse these valves in exactly the same manner as that described in connection with the motor shown in Figs. 1 to 5. These conduits may be supported on the pistons in any suitable manner, but are here shown as having pins 67 at their tops and bottoms which enter apertured plates 68 carried by the piston. The movement of each conduit about its pivotal center is controlled by a finger 69 which extends rearwardly therefrom and has a downturned end which is confined in a slot 70 formed in the adjacent plate 68. The finger has sufficient movement in the slot to permit the conduit to accommodate itself to the port and piston, respectively, as the motor piston moves toward the abutment, but this movement is not sufficient to permit the conduit to move out of alinement with the respective parts.

In Figs. 10 to 13 I have illustrated another embodiment of the invention which, in many respects, is the most satisfactory of any of the several forms in which this invention has so far been embodied. As shown in these figures, the invention is applied to an oscillating motor comprising a cylinder consisting of a body portion 71 and cylinder heads 72 connected one to the other by bolts 73 or in any other suitable manner. Journaled in the cylinder heads is the usual motor shaft 74 provided with a wing piston 75. Rigidly mounted in the cylinder and extending between the wall thereof and the shaft 74 is an abutment or partition 76 which coöperates with the piston to divide the interior of the cylinder into two chambers. This abutment or partition also constitutes a valve casing, and to this end it is provided with an inlet valve chamber 77 communicating with an inlet conduit 78, and with an exhaust valve chamber 79 communicating with an exhaust conduit 80. The inlet valve chamber 77 is provided on its opposite sides with ports 81 and 82 leading to the interior of the cylinder on opposite sides of the valve casing. These ports, however, do not communicate directly with the interior of the cylinder but are connected with conduits after the manner of that form of device shown in Fig. 1, but, in the present instance, the conduits are not movable but are formed within the fixed abutment or valve casing 76. In the present form of the invention these conduits are shown at 83 and 84 and are separated from the inlet and exhaust chambers by partitions 85 and 86. The flow of fluid from the inlet valve chamber 77 to the conduits 83 and 84 is controlled by an inlet valve comprising a disk-like body portion 87 having, on the sides thereof, two cylindrical extensions 88 and 89 forming piston valves and adapted to enter the ports 81 and 82 respectively to prevent the flow of fluid through these ports. The ports 81 and 82 are provided at their inner ends, that is, the ends adjacent to the inlet valve chamber, with annular recesses 90 and 91 adapted to receive the disk-like body portion 87 of the valve. The depth of the recesses 90 and 91, however, is less than the length of the piston-like extensions 88 and 89, and as the inlet valve moves toward one of the ports the piston-like extension will enter the port and cut off the flow of fluid through the same before the disk-like portion of the valve enters the annular recess. Consequently, when this disk-like portion of the valve does enter the recess, it will confine or "pocket" a quantity of water in that recess which will resist the further movement of the valve. The valve fits loosely in the recess and the water will gradually escape about the edge thereof, but the escape of the water will be sufficiently slow to cause it to form a cushion for the valve, thereby preventing the valve from coming forcibly into contact with its seat. This cushioning of the valve not only prevents noisy operation but also prevents injury to the valve, due to the impact of the same on the valve seat, which, when the valve is moved by water pressure, is apt to be violent.

The inlet valve is supported in position in the inlet chamber independently of the ports leading from that chamber to the conduits. As here shown, the valve is provided with elongated extensions or stems projecting on the opposite sides thereof and having their outer end portions cylindrical as shown at 92 and 93 and having their inner portions, adjacent to the piston-like extensions 88 and 89, fluted as shown at 94 and 95, the arrangement being such that when the valve is on either seat the cylindrical portion of one of the valve stems will close its port and the fluted portion of the other stem will establish communication, through its port, between the adjacent conduit and the interior of the cylinder. The purpose of this construction will hereinafter appear. The conduits 83 and 84 extend downward to points opposite the exhaust valve chamber 79 and there communicate respectively with passageways 96 and 97, leading to the interior of the cylinder on opposite sides of the valve casing. These passages are formed in enlarged portions of the partitions 85 and 86, and the walls of the passageways, adjacent to the conduits, and are provided with ports 98 and 99 by means of which the passages are connected with conduits. The exhaust valve chamber 79 also communicates with the interior of the cylinder by the passages 96 and 97 and to this end it is connected to these passages by means of ports 100 and 101, which ports are controlled by an exhaust valve comprising two disk-like valve members 102 and 103. These disk-like valve members are larger than the ports 100 and 101 and are provided with piston-like extensions 104 and 105 adapted to enter the respective ports and interrupt the flow of fluid from the cylinder to the exhaust chamber. The exhaust ports 100 and 101 are provided on the sides adjacent to the passages 96 and 97 with annular recesses 106 and 107 to receive the disk-like portions of the respective members of the exhaust valve. This construction is similar to that of the inlet valve and a similar cushioning action results therefrom. The disk-like portions of the exhaust valves fit snugly within the ports 98 and 99, leading from the conduits to the passageways, and are adapted to close these ports and thus prevent the flow of fluid from the conduit to the interior of the cylinder, it being understood, of course, that the two valve members are spaced apart such a distance that only one port will be closed at a time. The exhaust valve is supported by means of stems 108 and 109 which extend through the side walls of the valve casing. In the present instance the guide openings are formed in bushings 110 and 111 provided to afford access to the interior of the valve casing, but when these bushings are in place they constitute parts of the side walls. One of the stems of the inlet valve is also supported in a bushing 112 which is mounted in one side of the valve casing to afford access to the inlet valve chamber. This bushing 112 is screw-threaded into both the outer wall of the valve casing and into the partition 86, and to permit the passage of the fluid through the port 82, which port is formed in the end of the bushing, to the conduit 84, the cylindrical wall of the bushing is provided with a series of openings 113. The outer end of the bushing is closed except for a guideway or port which receives the extension or valve stem 93 of the valve. It will be noted that when this bushing is in position it forms a part of the partition 86 and a part of the outer wall of the valve casing 76, and the operation is the same as if the bushing were an integral part of the partition and wall. It is provided to facilitate the assembling of the device and to afford access to the inlet valve chamber. It will further be noted that the valve casing or abutment 76, with the exception of the bushing mentioned, is formed in a single piece preferably by casting. This provides a strong, rigid construction which can be produced at a low cost, and materially simplifies the assembling of the motor. I have also formed the abutment with screw-threaded projections or bolts 115 cast integral with the abutment and projecting beyond the ends thereof. These bolts extend through the cylinder heads and serve to clamp the cylinder heads tightly against the packing which is confined between the same and the respective ends of the abutment.

Figure 10:
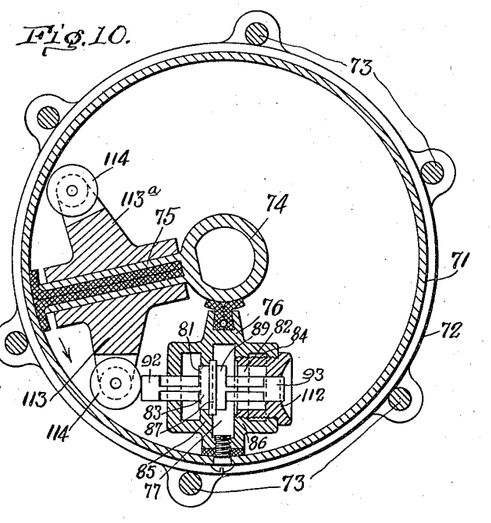
Fig. 10 is a horizontal sectional view taken through the inlet valve chamber of an oscillating motor embodying another form of the invention.
Figure 11:
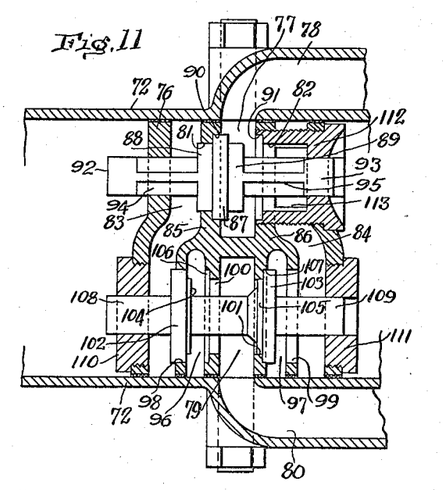
Fig. 11 is a sectional view taken vertically through the two valve chambers of the motor of Fig. 10, on a larger scale.
Figure 12:
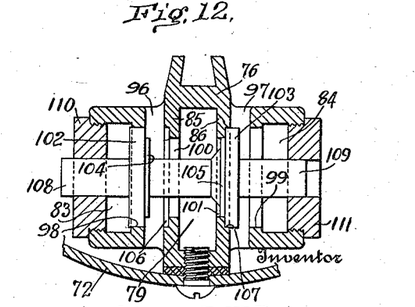
Fig. 12 is a horizontal sectional view of the valve casing taken through the exhaust valve chamber of the motor of Fig. 10.
Figure 13:
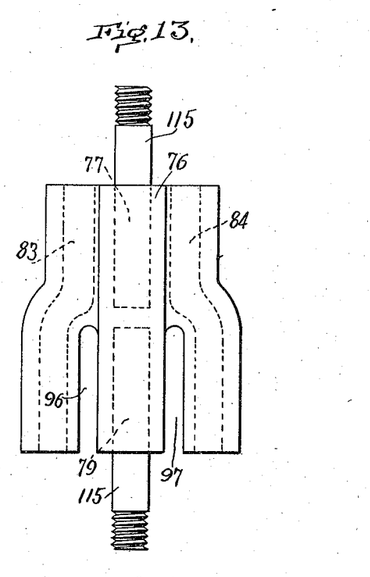
Fig. 13 is a detail view of the valve casing of this motor.

With the movable parts of the motor in the positions in which they are shown in Figs. 10, 11 and 12, assuming that the motor is working under full load, the piston 75 is moving in the direction of the arrow on Fig. 10 and is just about to unseat the inlet valve, the piston being provided with arms 113$^a$ and rollers 114 for this purpose. A slight further movement of the piston will force the inlet valve from its seat, thereby permitting the fluid to pass from the inlet chamber to the conduit 83 as well as to the conduit 84. The unseating of the inlet valve has, however, moved the cylindrical portion 92 of the valve stem into its port and the valve member 102 of the exhaust valve being seated in the port 98, the fluid has no outlet from the conduit 83 but is confined therein between the inlet valve and the exhaust valve and thus prevented from entering the cylinder before the inlet-valve crosses its dead center. As the inlet valve member moves toward the right, as shown in Fig. 11, the pressure within the conduit 83 is continually increasing and the pressure in the conduit 84 is correspondingly decreasing. The movement of the exhaust valve is, however, prevented before the inlet valve crosses its dead center, partly by the impact of the fluid passing through the port 99 and passageway 97 against the outer face of the exhaust valve member 103 and partly by extending the stems 108 and 109 through the walls of the valve casing so that the end of the valve stem 109 will be exposed to inlet pressure, while the end of the valve stem 108 will be exposed to exhaust pressure only. Consequently, the excess pressure against the valve stem 109 combined with the impact of the fluid insures the immovability of the exhaust valve member during this portion of the movement of the inlet valve member. However, as soon as the inlet valve member begins to cross its dead center the amount of fluid entering the conduit 84 is reduced, thereby relieving the pressure on the exhaust valve face 103 and the end of the exhaust valve 109, while at the same time the flow of fluid in the conduit 83 and the pressure on the exhaust valve member 102 and end of exhaust valve stem 108 is increased. It should be noticed that the valve 102 simply closes the port 98. There is no valve seat in said valve port 98, such as is shown at 101. In other words when the valve 102 is in the port 98 it does not constitute a tight fit and a certain amount of fluid will pass in front of the moving piston. It will, therefore, be seen that as soon as the inlet valve member has been forced across its dead center by the moving piston the exhaust valve member will begin to move, allowing an increased amount of fluid to pass through the port 98 into the cylinder in advance of the piston. The resulting reduction in pressure against the end of the valve stem 93 and the increase of pressure against the end of the valve stem 92 and the left hand face, as shown in Fig. 11, of the valve face 87 will result in the inlet valve being quickly shifted into its fully seated position in advance of the moving piston and independently thereof and before the exhaust valve member has been fully shifted. When the piston like extension 89 has entered the port 82 it completely obstructs the flow of fluid from the inlet chamber to the conduit 84 and, as has been explained, when the disk-like body portion of this valve enters the annular recess or valve seat a quantity of water is confined in the recess and escapes slowly about the edge of the valve, thus cushioning the action of the valve. When the inlet valve has been moved to such a position that it will close the port 82 leading to the conduit 84 the full water pressure will be exerted on the outer face of the valve 102 and the stem 108 and inasmuch as the closing of the port 82 will cut out the pressure from the outer face of the valve face 103 and from the end of the stem 109 it is obvious that the exhaust valve will be free to move under the pressure of the water in the conduit into a seated position. Before this occurs, however, and after the inlet valve member has been fully shifted, the piston, owing to the fact that a quantity of live water is still entering into the cylinder in the rear thereof will continue its movement toward the end of the valve stem 92. However, it should be noticed that the water which has been allowed to enter in front of the said moving piston will act as a cushioning medium and prevent the impact of the said piston against the said inlet valve member. As the exhaust valve moves under pressure the exhaust port 101 is opened and the port 99 leading from the conduit 84 to the passage 97 is closed. The fluid in the conduit 84 and the port 99 is permitted to escape through the relief ports formed by the fluted portions 95 of the inlet stem, thus preventing the fluid from resisting the movement of the exhaust valve member. At the same time the port 98 is opened and the port 100 closed, permitting the fluid to pass from the conduit 83 through this port 98, through the passage 96 and into the cylinder, causing the piston to move in a direction opposite that shown in Fig. 10. It will be noted that the construction of the exhaust valve and its seat is such as to cushion the action of the valve member in the same manner that the action of the inlet valve is cushioned. After the movement of the exhaust valve has been completed the piston will move in the reverse direction until it comes in contact with the inlet valve and moves the valve 89 from the port 82, thus opening this port and causing the same cycle of operations as has been described above. It will be understood, of course, that this cycle of operation takes place very rapidly and there is no appreciable interruption in the movement of the piston. It moves to one limit of its movement and then immediately begins its movement in the opposite direction.

This embodiment of the invention has the peculiar characteristic of being capable of operation with the motor fluid entering in the reverse direction, that is, the conduit 80 and the valve chamber 79 can be utilized for the inlet of the motor fluid and the valve chamber 77 and conduit 78 can be used for the exhaust. The operation under such circumstances is as follows, assuming the parts to be in the position shown in Figs. 10, 11 and 12, with the conduit 80 connected with a source of fluid supply: The water will enter through the conduit 80, the inlet chamber 79 and passage 96 to the interior of the motor cylinder, and will act upon the piston 75 to move the same in the direction opposite that indicated by the arrow in Fig. 1. This movement of the piston forces the water from the exhaust side of the piston, through the passage 97 to the conduit 84 and thence through the valve chamber 77 and conduit 78 to the exhaust pipe. The inlet pressure is against the end of the valve stem 92 while the end of the valve stem 93 is subjected to the exhaust pressure only. Thus, the inlet valve is moved by this pressure toward the valve seat 82. It continues to move in this direction until it compresses the exhaust fluid against the face of the piston-like extension 89 of the inlet valve sufficiently to counteract the pressure on the end of the valve stem 92. The difference in the areas of these two parts of the inlet valve is such that the port 82 cannot be entirely closed by the pressure on the end of the valve stem 92. The movement of the valve is such, however, as to cause the cylindrical ends 92 and 93 of the two valve stems to close their ports, thus preventing the passage of fluid between the cylinder and the conduits. To the same extent that the inlet valve obstructs the passage of the exhaust water, there is a corresponding reaction against the outer face of the exhaust valve member 103 and the end of the exhaust valve stem 109 which tends to hold the exhaust valve 103 on its seat, it being noted in this connection that the inner faces of both the exhaust valve members 102 and 103 are exposed to inlet pressure and while this pressure is approximately equal on both faces, the exposed face of the valve member 102 is slightly greater than the exposed face of the valve member 103, thus giving an additional pressure tending to hold the valve member 103 on its seat and tending to counteract the difference in the pressures on the ends of the valve stems 108 and 109, the former being exposed to inlet pressure and the latter to exhaust pressure only. The piston travels from the position shown in Fig. 10 in a direction opposite the arrow, until the roller on the advance side thereof engages the valve stem 93 of the inlet valve, forcing the inlet valve toward its seat, and thereby, first relieving the compression of the exhaust fluid by the inlet valve and thus relieving the back pressure of the exhaust against the valve member 103 and its valve stem 109. As the movement of the motor piston forces the inlet valve toward the port 81 the fluted portion 94 of the valve stem is moved into its port, opening the latter and allowing the inlet pressure to enter the conduit 83 and act on the outer face of the valve member 102. This increase of pressure on the valve member 102 together with the decrease in the exhaust pressure against the exhaust member 103 results in the exhaust valve being shifted to the right to cause the inlet fluid to pass from the chamber 79 to the passage 97 and thence to the cylinder, thereby causing a reversal of the movement of the piston. The inlet valve 87 is in a position close to the port 81 when the exhaust valve is reversed but the action of the exhaust fluid against this valve is sufficient to overcome the pressure of the inlet fluid on the end 93 thereof and to move the valve away from the port 81 far enough to permit of the escape of the fluid. However, the valve will, as before described, oppose the flow of the exhaust fluid sufficiently to cause a reaction or back pressure which tends to hold the exhaust valve in its reverse position.

The cycle of operations above described is carried out with each complete movement of the motor piston. It will be noted that when the motor is operated with the fluid moving in a reverse direction the exhaust valve constitutes both an exhaust valve and an inlet valve, the ports 100 and 101 serving as inlet ports and the ports 98 and 99 serving as exhaust ports. The inlet valve 87 does not have the function of an exhaust valve but serves merely to compress the exhaust fluid in such a manner as to cause it to act upon the exhaust valve to hold the same in its seated position, and is not completely seated in either of its ports.

The operation of the motor will be clearly understood from the description of the several forms of the invention, and it will be obvious that in the operation of each form of the invention the inlet valve is positively unseated by the action of the piston and the fluid permitted to pass through both the inlet ports. The fluid, however, is prevented by the exhaust valve from entering the cylinder in advance of the piston until the inlet valve has been fully shifted, that is, moved into a position where it requires no further assistance to complete its movement. When the exhaust valve has been fully shifted the flow of the inlet fluid to the cylinder on the rear side of the piston has been either completely or almost completely interrupted and the pressure of this fluid on the exhaust valve is sufficient to shift the same, either with or without assistance in unseating the exhaust valve. As a result of this operation there is no possibility of the inlet fluid entering on both sides of the piston and subjecting the same to substantially equal pressures and thereby causing it to balance, and, consequently, stopping its operation. It will be noted that both when the motor is operating with the fluid flowing in a normal direction and when it is operating with the fluid flowing in a reverse direction, the exhaust valve has both the function of an inlet valve and of an exhaust valve. With the fluid flowing in a normal direction the action of the exhaust valve as an inlet valve is supplemental to the action of the main inlet valve, but with the fluid flowing in a reverse direction the exhaust valve constitutes the main inlet valve as well as the exhaust valve.

While I have herein shown and described several forms of the invention it will be understood that these particular forms have been chosen merely for the purpose of illustrating the invention and that it could be embodied in numerous forms in various types of motors. I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a motor, the combination, with a cylinder and a piston, of an inlet valve adapted to be unseated by the movement of said piston, and means spaced from and mounted independently of said inlet valve to prevent the fluid which passes about said inlet valve after it has been unseated from entering said cylinder in advance of said piston before said inlet valve has been shifted across its dead center.

2. In a motor, the combination, with a cylinder, of inlet and exhaust valves, said valves being spaced apart and mounted independently of each other, and means including said exhaust valve to prevent the fluid which passes about said inlet valve from entering said cylinder in advance of the piston before said inlet valve has passed its dead center position.

3. In a motor, the combination, with a cylinder and a piston, of an inlet valve to control the flow of fluid to said cylinder, conduits arranged to receive the fluid passing about said inlet valve and conducting the same to said cylinder, means comprising an exhaust valve to prevent the escape of fluid from that conduit leading to the cylinder in advance of the said piston until said inlet valve has been shifted across its dead center, and means to allow the unseating of said exhaust valve before the said inlet valve has been fully shifted.

4. In a motor, the combination, with a cylinder, and a piston mounted in said cylinder, of inlet and exhaust valves to control the flow of fluid to and from said cylinder, means including the exhaust valve to prevent the fluid which passes about said inlet valve when the latter has been unseated from entering the cylinder in advance of said piston, and means to prevent the movement of said exhaust valve until said inlet valve has been shifted across its dead center.

5. In a motor, the combination, with a cylinder, and a piston mounted in said cylinder, of inlet and exhaust valves to control the flow of fluid to and from said cylinder, conduits arranged to receive the fluid passing about said inlet valve, said inlet valve being arranged to be unseated by the action of said piston, and means for confining the fluid which passes about said inlet valve when the latter has been unseated in the conduit which receives the same and causing the fluid so confined to shift the exhaust valve.

6. In a motor, the combination, with a cylinder, and a piston mounted in said cylinder, of inlet and exhaust valves to control the flow of fluid to and from said cylinder, means including the exhaust valve to prevent the fluid which passes about said inlet valve when the latter has been unseated from entering said cylinder in advance of said piston, said exhaust valve being so constructed and arranged that the pressure of the inlet fluid entering said cylinder in the rear of said piston will hold the same against movement during the movement of the inlet valve across its dead center position.

7. In a motor, the combination, with a cylinder, and a piston mounted in said cylinder, of inlet and exhaust valves to control the flow of fluid to and from said cylinder, said inlet valve being arranged to be shifted by the action of said piston, and means comprising the exhaust valve for so controlling the flow of fluid as to allow said inlet valve to be shifted across its dead center by the action of said piston.

8. In a motor, the combination with independently supported inlet and exhaust valves of means for confining fluid under pressure between said valves.

9. In a motor, the combination with a cylinder and independently supported inlet and exhaust valves, of means to cause said inlet valve to be unseated and to cause the fluid passing about the same to act upon said exhaust valve before it enters said cylinder.

10. In a motor, the combination with a cylinder and independently supported inlet and exhaust valves, of means for unseating said inlet valve, confining the fluid passing about the same between the two valves, and causing said fluid to act upon said exhaust valve.

11. In a motor, the combination with an inlet valve and an exhaust valve, said valves having opposed surfaces, of means for confining fluid under pressure between said surfaces.

12. In a motor, the combination with a cylinder, an inlet valve and an exhaust valve, said valves being independently mounted, of means for unseating said inlet valve and means including said exhaust valve for controlling the passage of the fluid from said inlet valve, when the latter has been unseated, to said cylinder.

13. In a motor, the combination, with inlet and exhaust chambers provided with ports, of inlet and exhaust valves independently mounted to control the flow of fluid through the respective ports, and means comprising a part connected with said exhaust valve to interrupt the flow of fluid through the port of said inlet chamber.

14. In a motor, the combination, with inlet and exhaust chambers provided with ports, of inlet and exhaust valves independently mounted to control the flow of fluid through the respective ports, and means to interrupt the flow of fluid about said inlet valve when the latter has been unseated and to cause said fluid to act upon said exhaust valve.

15. In a motor, the combination with a cylinder, of a valve casing having inlet and exhaust chambers, said casing having two passages leading to said cylinder, on opposite sides of said casing, and each communicating with both said inlet chamber and said exhaust chamber, and an exhaust valve having parts to simultaneously interrupt the communication between one of said passages and said inlet chamber and between the other of said passages and said exhaust chamber.

16. In a motor, the combination, with a cylinder, of a valve casing having inlet and exhaust chambers and conduits communicating with said inlet chamber, said casing having passages leading to the opposite sides of said casing, and ports to connect each of said passages with one of said conduits and said exhaust chamber, an inlet valve to control the flow of fluid to said conduits, and an exhaust valve to control the flow of fluid through the ports connecting said passages with said exhaust chamber and said conduits.

17. In a motor, the combination, with a cylinder, and a piston mounted in said cylinder, of a valve casing having inlet and exhaust chambers provided with ports, inlet and exhaust valves to control said ports, means to unseat said inlet valve, means including said exhaust valve to control the flow of fluid about said inlet valve when the latter has been unseated, and means for subjecting said exhaust valve to a pressure sufficient to counteract the pressure of the fluid passing about said inlet valve when the latter has been unseated.

18. In a motor, the combination, with a cylinder, of a valve casing having an inlet chamber and an exhaust chamber and having passageways leading to the opposite sides of said casing and communicating with said exhaust chamber, conduits connecting said inlet chamber with the respective passages, an exhaust valve having parts to control the communication between said passages and said conduits and between said passages and said exhaust chamber, said parts being of substantially equal area, a valve stem supporting said exhaust valve and having its ends extending into said cylinder on opposite sides of said casing, whereby one end of said stem will be subjected to a greater pressure than the other end and this pressure will tend to hold said exhaust valve against movement.

19. In a motor, the combination, with a cylinder, of a valve casing having an inlet chamber and an exhaust chamber, passages leading to said cylinder on opposite sides of said casing, and having ports communicating with said exhaust chamber, conduits leading from said inlet chamber to said passages and having ports arranged in alinement with the first-mentioned ports, an exhaust valve comprising two parts, each part being adapted to control both the ports of one of said passages.

20. In a motor, the combination, with a cylinder of a valve casing having an inlet chamber and an exhaust chamber, passages leading to said cylinder on opposite sides of said casing, and having ports communicating with said exhaust chamber, conduits leading from said inlet chamber to said passages and having ports arranged in alinement with the first-mentioned ports, an exhaust valve comprising two parts, each part being adapted to control both the ports of one of said passages, said exhaust valve also comprising a supporting stem slidably mounted in the walls of said casing and having its ends exposed to the pressure of the fluid in said cylinder on opposite sides of said casing.

21. In a motor, the combination, with a cylinder of a valve casing having an inlet chamber and an exhaust chamber, passageways leading to said cylinder on opposite sides of said casing, and having ports communicating with said exhaust chamber, conduits leading from said inlet chamber to said passages and having ports arranged in alinement with the first-mentioned ports, an exhaust valve comprising two parts, each part being adapted to control both the ports of one of said passages, said parts of said exhaust valve having piston-like portions adapted to enter the ports connecting said passages with said conduits, an inlet valve to control the flow of fluid from said inlet chamber to said conduits and relief ports controlled by the movement of said inlet valve.

22. In a motor, a valve casing having formed therein inlet and exhaust chambers, passages leading to the opposite sides of said casing, conduits connecting said inlet chamber with the respective passages, and ports connecting said passages with said exhaust chamber.

23. In a motor, the combination, with a valve casing comprising a valve chamber having ports, and conduits communicating with the respective ports, of a valve mounted in said valve chamber and having a valve stem, one end of said valve stem being mounted in the outer wall of one of said conduits, a bushing mounted in said casing, extending through the other of said conduits and having at its outer end an opening to receive the other end of said valve stem, said bushing being provided at its inner end with a valve seat for the adjacent port of said inlet chamber, and being also provided with openings connecting said port with the conduit through which said bushing extends.

24. In a motor, the combination, with a valve casing comprising inlet and exhaust chambers, passages leading from said exhaust chamber to the opposite sides of said casing, said exhaust chamber communicating with an exhaust passage, and conduits connecting said inlet chamber with said passages, of an inlet valve mounted in said inlet chamber and an exhaust valve mounted in said exhaust chamber.

25. In a motor, the combination, with a cylinder, and a valve casing having two chambers, and passages connecting the two chambers with said cylinder and with each other, of valves independently mounted in said chambers, said valves being so constructed that either of said valve chambers may be used as the inlet chamber or the exhaust chamber.

26. In a motor, the combination, with a cylinder of a valve casing comprising an inlet chamber having ports on the opposite sides thereof, an inlet valve having piston-like portions adapted to enter said port, said valve casing also having an exhaust chamber provided with ports on the opposite sides thereof, passages leading from said ports to said cylinder on opposite sides to said casing, conduits leading from the two ports of said inlet chamber to the respective passages, and an exhaust valve to control the ports of said exhaust chamber, and having piston-like portions adapted to extend into the ports connecting said conduits with said passages.

27. In a motor, the combination, with a cylinder, of a valve casing having two valve chambers, conduits leading from the opposite sides of one of said chambers to points adjacent to the other of said chambers, passages communicating with the interior of the cylinder on opposite sides of said valve casing, ports connecting said conduits with the respective passages, other ports connecting said other valve chamber with the respective passages, and a valve comprising two members, each member being adapted to control the two ports on the adjacent side of said other valve chamber, said valve and said ports being so arranged that said chamber may serve either as an inlet chamber or as an exhaust chamber and that said valve will act both as an inlet valve and as an exhaust valve.

28. In a motor, the combination, with a cylinder, of a valve casing having two valve chambers, conduits leading from the opposite sides of one of said chambers to points adjacent to the other of said chambers, passages communicating with the interior of the cylinder on opposite sides of said valve casing, ports connecting said conduits with the respective passages, other ports connecting said other valve chamber with the respective passages, and a valve comprising two members, each member being adapted to control the two ports on the adjacent side of said other valve chamber, whereby said valve may serve both as an inlet valve and an exhaust valve, and a separate valve mounted in said first-mentioned valve chamber.

29. In a motor, the combination, with a cylinder, of a valve casing having two valve chambers, conduits leading from the opposite sides of one of said chambers to points adjacent to the other of said chambers, passages communicating with the interior of the cylinder on opposite sides of said valve casing, ports connecting said conduits with the respective passages, other ports connecting said other valve chamber with the respective passages, and a valve comprising two members, each member being adapted to control the two ports on the adjacent side of said other valve chamber, and a valve in said first-mentioned valve chamber having a valve stem arranged to be acted upon by the inlet fluid to cause said valve to compress the exhaust fluid and to create a back pressure against said exhaust valve to hold the same on its seat.

30. In a motor, the combination, with a cylinder, of a valve casing having two valve chambers, conduits connecting said valve chambers one to the other, and valves mounted in said valve chambers, said valves being so constructed and arranged that one of said valves will act both as an exhaust valve and an inlet valve, whereby the chamber of said last-mentioned valve may be used either as an inlet chamber or an exhaust chamber.

31. In a motor, the combination, with a cylinder, of a piston mounted in said cylinder, a valve casing having conduits, valve ports, and passageways for receiving, directing and discharging a motive fluid, inlet and exhaust valves spaced apart to control the flow of said fluid, means for unseating the exhaust valve after the inlet valve has been shifted across its dead center position by the piston, and means including said exhaust valve to cause the inlet fluid to enter the cylinder in advance of the piston, and exert a pressure upon said piston, and the outer face of the stems of the inlet and exhaust valves simultaneously, before said valves have been fully shifted.

In testimony whereof, I affix my signature in presence of two witnesses.

HENRY W. YOST.

Witnesses:
W. B. BAUER,
CHAS. P. MOSHER.

Copies of this patent may be obtained for five cents each, by addressing the "Commissioner of Patents, Washington, D. C."